United States Patent
Chu

(10) Patent No.: US 6,311,268 B1
(45) Date of Patent: *Oct. 30, 2001

(54) COMPUTER MODULE DEVICE AND METHOD FOR TELEVISION USE

(75) Inventor: William W. Y. Chu, Los Altos, CA (US)

(73) Assignee: Acqis Technology, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,326

(22) Filed: Nov. 6, 1998

(51) Int. Cl.[7] .................................................. G06F 9/00
(52) U.S. Cl. ................................................ 713/1; 710/100
(58) Field of Search ................................ 713/1; 710/100; 345/326, 327, 333, 302, 156, 418

(56) References Cited

U.S. PATENT DOCUMENTS

| | | |
|---|---|---|
| 3,996,585 * | 12/1976 | Hogan et al. . |
| 4,769,764 | 9/1988 | Levanon . |
| 4,872,091 | 10/1989 | Maniwa et al. . |
| 5,331,509 | 7/1994 | Kikinis . |
| 5,463,742 | 10/1995 | Kobayashi . |
| 5,539,616 | 7/1996 | Kikinis . |
| 5,550,710 | 8/1996 | Rahamim et al. . |
| 5,550,861 | 8/1996 | Chan et al. . |
| 5,600,800 | 2/1997 | Kikinis et al. . |
| 5,640,302 | 6/1997 | Kikinis . |
| 5,680,126 | 10/1997 | Kikinis . |
| 5,752,080 * | 5/1998 | Ryan ........................................ 710/8 |
| 5,795,228 * | 8/1998 | Trumbull et al. ...................... 463/42 |
| 5,809,538 * | 9/1998 | Pollmann et al. ..................... 711/151 |
| 5,941,965 | 8/1999 | Moroz et al. . |
| 5,948,047 | 9/1999 | Jenkins et al. . |
| 5,977,989 * | 11/1999 | Lee et al. ............................. 345/503 |
| 5,982,363 * | 11/1999 | Naiff .................................... 345/327 |
| 5,999,952 | 12/1999 | Jenkins et al. . |
| 6,002,442 * | 12/1999 | Li et al. ............................... 348/447 |
| 6,011,546 * | 1/2000 | Bertram ............................... 345/327 |
| 6,028,643 * | 2/2000 | Jordan et al. ........................ 348/552 |
| 6,029,183 | 2/2000 | Jenkins et al. . |
| 6,216,185 | 4/2001 | Chu .................................... 710/101 |

FOREIGN PATENT DOCUMENTS

| | | |
|---|---|---|
| 0722138A1 | 7/1996 | (EP) . |
| 06289953 | 10/1994 | (JP) . |
| WO92/18924 | 10/1992 | (WO) . |
| WO94/0097 | 1/1994 | (WO) . |
| WO95/13640 | 5/1995 | (WO) . |

* cited by examiner

Primary Examiner—Robert Beausoleil
Assistant Examiner—Rita Ziemer
(74) Attorney, Agent, or Firm—Townsend&Townsend&Crew LLP

(57) ABSTRACT

A computer module removably coupled to a console for outputting video data, includes a host interface controller coupled to receive a console configuration signal from the console, a graphics accelerator, a television signal encoder coupled to the graphics accelerator for receiving video data and for outputting television signals, and a central processing unit coupled to the host interface controller, to the graphics accelerator, and to the television signal encoder, for processing the console configuration signal and for enabling the television signal encoder to output the television signals to the console.

25 Claims, 5 Drawing Sheets

COMPUTER MODULE DEVICE AND METHOD FOR TELEVISION USE

BACKGROUND OF THE INVENTION

The present invention relates to modular computer systems. More particularly, the present invention relates to a modular computer system for use in multiple environments.

Desktop computer systems and television set-top entertainment systems (set-top boxes or systems) are currently as similar as apples are to oranges. Other than both being fruit, they are targeted to different markets, they include different technologies, and they have drastically different price points. In today's computing environments, users use desktop computers typically for productivity and personal entertainment purposes either in the office or at home. In contrast, set-top boxes are primarily directed for family entertainment purposes at home.

Up to now, there has been little common ground between these hardware platforms. For example, typical desktop computers primarily include microprocessors such as the Pentium II from Intel Corporation or Motorola Corporation's Power PC G3 processor. In contrast, there are a number of set-top systems each including different computational processors. For example, Nintendo Corporation's N64 includes a 64 bit MIPS RISC processor, Sony Corporation's Playstation includes a 32 bit R3000A RISC processor, Sega Corporation's Dreamcast includes a Hitachi SH-4 RISC chip, a WebTV includes a 64 bit, R4640 RISC Processor, and the like.

As a result of the differences of hardware, users are typically required to buy software developed only for that hardware platform. For example, if a user bought a game for the desktop computer, the game could not be used by a Sony Playstation, an N64, and the like. As new set-top platforms are being developed even today, the software incompatibilities of the set-top market and the desktop market continually raises the cost of software for the consumer and for the software manufacturer.

The set-top market has typically been very cost sensitive, thus computing solutions available in desktop computers has been sparingly transferred to the set-top market. As described above, there has been almost no common ground between the software operating systems or application programs either. One solution to attempt to bridge the gap has been to provide desktop computers with television output capability. One such solution was the Gateway Corporation Destination Series of computer.

One drawback to this solution includes that the desktop computer must be located within close proximity to the television in order to receive the video output signal. As a result even when being used only for desktop productivity purposes, the user is stuck in the same room as the loud television, the noisy kids, the barking dog, and the like.

Another drawback is that a different peripheral configuration is typically required when the computer system is used for set-top entertainment and when used as desktop computer. As a result, peripherals must be connected and disconnected and the computer system must be manually reconfigured each time. For example, when used as a set-top, the users may require peripherals such as joy sticks, light guns, rumble packs, and the like; whereas when used as a desktop, the users may require a drawing tablet, a cradle for a personal information manager (PIM) such as a 3Com Corporation PalmPilot, a scanner, and the like.

Another solution developed to attempt to bridge the gap between the desktop and the set-top markets has been with network computer (NCs) such as Web-TV from Microsoft Corporation. NC's are typically stripped-down desktop computers that provide Internet web surfing capability.

A drawback to NCs include that they have lower performance and functionality than a desktop computer. For example, the processor of a set-top is typically much slower and much lower performance than processors in dedicated desktop computers. As another example, NC's include very limited amounts of memory, and little, if any hard disk storage.

Another drawback to the current dichotomy between NCs and desktop computers is that the user has to spend money to buy components and peripherals that are duplicated in the other system. For example, the Web-TV box and other set-top system can include their own a hard disk, floppy drives, CD-ROMS, DVD-ROMS, memory (RAM and ROM), graphics accelerators, and the like that are also required for a desktop computer system.

For desktop computers, modular desk-top computer architectures have been recently proposed. Such architectures however focus upon the interchangability and upgradability of computer peripherals. For example, a new "standard" known as "Device Bay" has been proposed by Compaq Computer Corporation, and other personal computer manufacturers. The Device Bay is currently focused upon computer peripheral devices such as CD-ROMS, DVD drives, hard disk drives, and the like for desktop computers.

One drawback with the Device Bay standard is that the Device Bay is not focused upon other components the user may wish upgrade, such as the CPU, the memory, graphics accelerators, and the like. Another drawback is that the Device Bay is oriented towards making user upgrades to a desktop computer easier, and not focused upon the interchangability with set-top devices.

Thus what is needed are methods and apparatus that provide reduced user investment in redundant computer components and provide interchangeable components between desktop usage and set-top usage.

SUMMARY OF THE INVENTION

The present invention relates to a modular computer system. In particular, the present invention relates to a modular computer system having computer modules suitable for use in a desktop computing system as well as a set-top entertainment system.

According to an embodiment of the present invention a computer module removably coupled to a console for outputting video data, includes a host interface controller coupled to receive a console configuration signal from the console, a graphics accelerator, and a television signal encoder coupled to the graphics accelerator for receiving video data and for outputting television signals. The computer module also includes a central processing unit coupled to the host interface controller, to the graphics accelerator, and to the television signal encoder, for processing the console configuration signal and for enabling the television signal encoder to output the television signals to the console.

According to another embodiment of the present invention, a set-top console coupled to a removable computer module for configuring the operation of the removable computer module, the removable computer module including a processor and multiple video display outputs, the computer console includes a computer module bay electrically and physically coupled to the removable computer module, the computer module bay. The computer module bay includes a power bus for providing power to the removable computer module, a configuration data source for providing configuration data to the removable computer module, and a video bus for receiving a video output data from the removable computer module in response to the configuration data. The set-top console typically includes a power supply to provide power to the removable computer module, a modem (analog or cable) to connect to a network such as the Internet, and infrared transmitter and receiver for remote data entry devices, such as a mouse, a keyboard, and the like.

According to another embodiment of the present invention, a method for configuring performance of a removable computer module having a processor includes inserting the removable computer module into a computer console, supplying power from the computer console to the removable computer module, supplying configuration data from the computer console to the removable computer module;, determining configuration signals in response to the configuration data, and determining a video output mode in response to the configuration signals.

According to another embodiment, the set-top box console can be integrated into an NTSC or PAL TV, or an HDTV. The useful life of conventional TV sets is often up to 10 years, significantly longer than typical home computers. Thus the integrated console provides a lower integration cost for the combined unit, and a simple computer upgrade path. Because computer modules are expected to undergo rapid technological advantages with the lifespan of the TV, a consumer can continually upgrade to the latest computer technology by simply upgrading to a new computer module while still using the same TV.

Further understanding of the nature and advantages of the invention may be realized by reference to the remaining portions of the specification and drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

Overview

Figure 1:
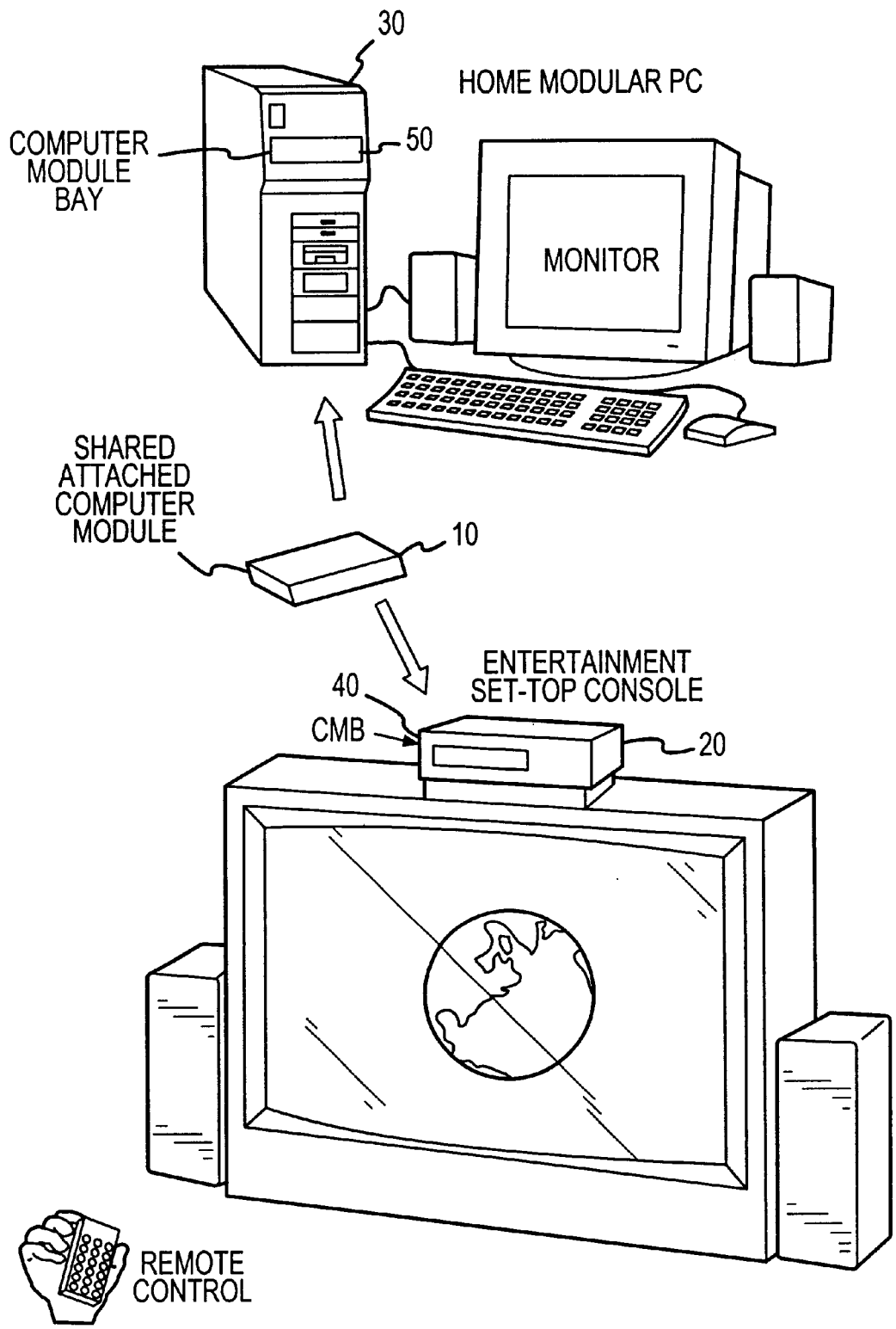
FIG. 1 illustrates an embodiment of the present invention.

FIG. 1 illustrates an embodiment of the present invention. FIG. 1 includes an attached computer module (ACM) 10, a set-top console 20, and a desktop console 30. Set-top console 20 includes a computer module bay 40 and desktop console 30 includes a computer module bay 50.

In the present embodiment ACM 10 includes typical computer components, as will be described below, including a CPU, IDE controller, hard disk drive, computer memory, and the like. The Computer Module Bays (CMBs) 40 and 50 are openings in peripheral consoles, for example set-top console 20 and desktop console 30. The CMBs provide mechanical protection to ACM 10, mechanical alignment mechanism for the mating between the parts, thermal heat dissipation sinks, electrical connection mechanisms, and the like.

Set-top console 20 and desktop console 30 typically include computer components including a power supply (or battery), audio processing and output devices, modems, displays, and the like. Further information regarding ACM 10, and desktop console (DCON) 30, are disclosed in co-pending application Ser. No. 09/149,882 filed Sep. 8, 1998 entitled Communication channel and interface device for bridging computer interface buses, and co-pending application Ser. No. 09/149,882 filed Sep. 8, 1998 entitled Communication Channel And Interface Device For Bridging Computer Interface Buses, and co-pending application Ser. No. 09/149,548 filed Sep. 8, 1998, entitled Personal Computer Peripheral Console With Attached Computer Module. These applications are incorporated by reference for all purposes.

In certain embodiments, the core computing power in the ACM has the central processing unit (CPU), system memory, any auxiliary processors, and primary mass storage (e.g., a hard disk drive) which serves as the boot device for the computer system. The user's core environment contained in the ACM includes the primary operating system software files, frequently used application software files, files containing the user's working data, and stored configuration data that controls various aspects of software operation customized to the user's characteristics or preferences. Absent from certain embodiments of the ACM are any substantial power supply, and any substantial input/output device such as would normally be used by the computer operator to interact and exploit the range of functionality provided by the operating system and application software.

The peripheral console (PCON) provides the remaining components of a personal computer system including substantial power supply and input/output devices. Different PCON designs provide different usage possibilities for the user's core computing power and environment. Example PCON's include desktop computer, notebook computer, notepad computer, and computer-based entertainment computer designs.

In certain embodiments, the PCON houses the primary power supply. The primary power supply has sufficient capacity to power both the PCON and the ACM for normal operation. Note that the ACM may include a secondary "power supply" in the form, for example, of a small battery. Such a power supply could be included in the ACM to maintain, for example, a time-of-day clock, configuration settings when the ACM is not attached to a PCON, or machine state when moving an active ACM immediately from one PCON to another. The total energy stored in such a battery in certain embodiments would, however, be insufficient to sustain operation of the CPU at its rated speed, along with the memory and primary mass storage, for more than a fraction of an hour, if the battery were able to deliver the required level of electrical current at all.

In the present embodiment ACM 10 is typically inserted into computer bay 40 when the user wishes to use set-top console 20. When ACM 10 is inserted into computer bay 40, the combination of ACM 10 and set-top console 20 substantially provides the user with the functionality of a set-top entertainment system. Such a combination may be used in conjunction with any other home entertainment systems, for example, a television monitor, a stereo system, and the like.

In the present embodiment ACM 10 is typically inserted into computer bay 50 when the user wishes to use the desktop console 20. When ACM 10 is inserted into computer bay 50, the combination of ACM 10 and desktop console 30 substantially provides the user with the functionality of typical desktop computers. For example, enabling LAN access, providing full-sized keyboard input, enabling a high resolution display, and the like.

Block Diagram

Figure 2:
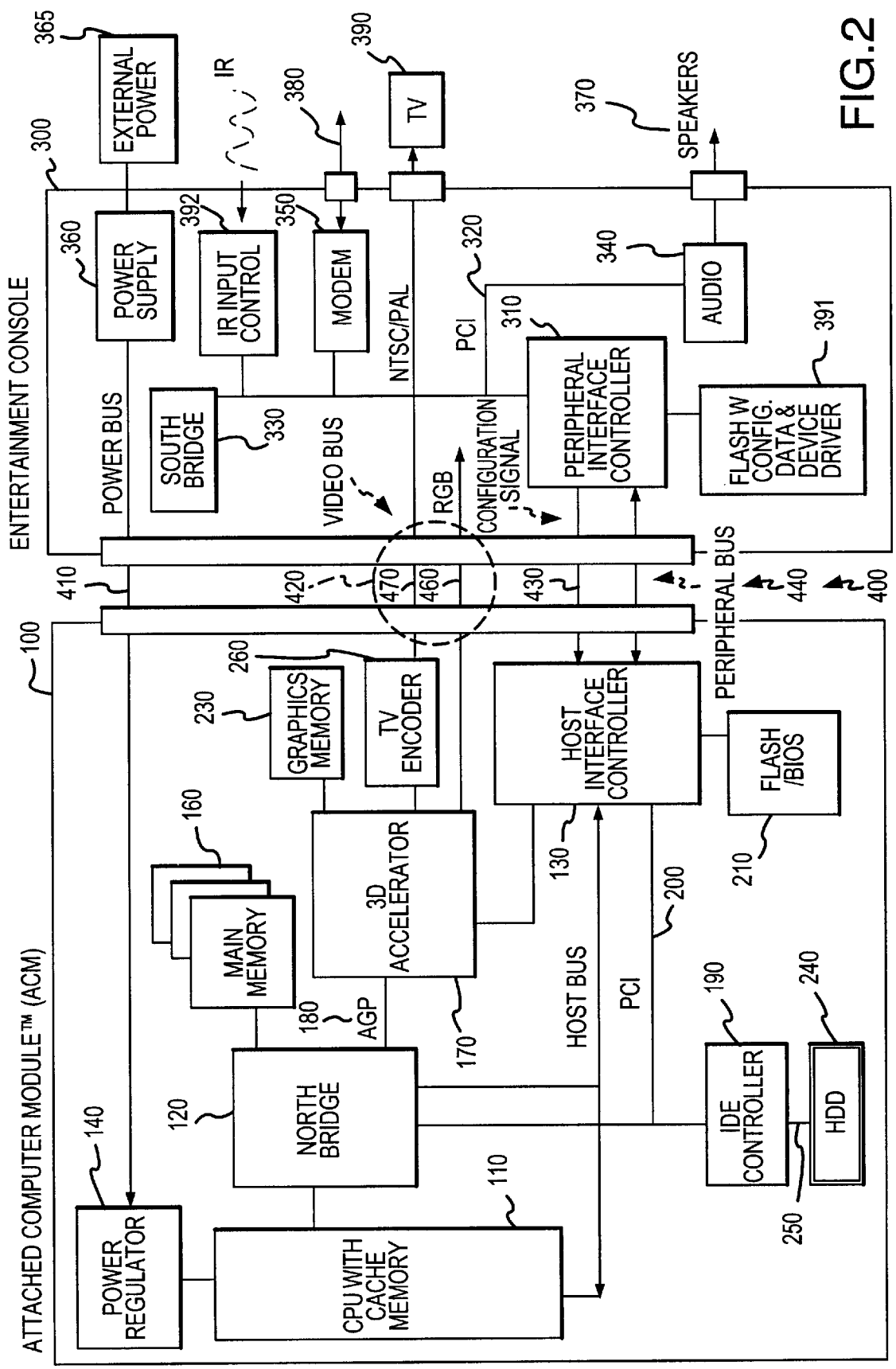
FIG. 2 is a simplified block diagram of an embodiment of the present invention.

FIG. 2 is a simplified block diagram of an embodiment of the present invention. FIG. 2 illustrates a block diagram of an attached computer module (ACM) 100, a set-top console 300, and an interface 400.

Interface 400 typically includes a number of interfaces including a power bus 410, a video bus 420, a configuration interface 430 and a peripheral bus 440. Video bus typically includes an analog driver interface 470 (typically NTSC and or PAL) and an analog RGB interface 460.

ACM 100 includes a central processing module with an attached cache memory (CPU) 110, coupled to a north bridge unit 120, to a host interface controller 130, and to a power regulator 140.

North bridge unit 120 is coupled to computer memory 160, to a graphics accelerator 170 via an advanced graphics port (AGP) 180, to an IDE controller 190, and to host interface controller 130 via a peripheral component interconnect (PCI) bus 200.

Host Interface controller 130 is also coupled to a BIOS/ flash memory 210, to configuration signal 430, and to peripheral bus 440. Input into power regulator 140 comes from power bus 410.

Graphics accelerator 170 is typically coupled to a graphics memory 230, to an analog driver 260, and to RGB interface 460. IDE controller 190 is coupled to a mass storage device 240 via an IDE bus 250

Set-top console 300 typically includes a Peripheral interface controller 310 coupled to configuration interface 430, to peripheral bus 440, and to a PCI bus 320. PCI bus 320 is in turn coupled to a south bridge unit 330, to an audio driver 340, to a modem 350, and to a wireless control receiver 392. Audio driver 340 is typically coupled to audio output devices (such as speakers) 370, and Modem (or other network interface device) 350 is typically removably coupled to a network interface port 380.

Set-top console 300 typically is typically coupled to a television display 390. A power supply 360 is typically coupled to power bus 410 and an external power supply 365.

As described in the referenced disclosures, CPU 110 resides in ACM 100 which is removably coupled from set-top console 300, as well as a desktop console, for example DCON 30 in FIG. 1. In one embodiment of the present embodiment, CPU 110 is a 400 MHz Pentium II microprocessor module from Intel Corporation. In other embodiments, other types of microprocessors can be used, such as the Advanced Micro Devices K6-2 chip, Compaq Computer Corporation Alpha Chip, Apple Computer Corporation PowerPC G3 processor, and the like. Further, higher speed processors are contemplated in other embodiments as technology increases in the future.

North bridge 120 typically provides access from CPU 110 to main memory 160, supports and provides timing signals necessary for AGP 180 and PCI bus 200, and provides access from and to host interface controller 130. In the present embodiment, north bridge unit 120 is embodied as a 440 BX chip from Intel. Future enhancements by Intel and other manufactures are envisioned in other embodiments of the present invention.

South bridge 120 typically provides access from peripheral interface controller 310, and supports and provides timing signals necessary for PCI bus 320. In the present embodiment, south bridge unit 120 is embodied as a P11X4E chip from Intel. In another embodiment, south bridge can be located in the ACM. Future enhancements by Intel and other manufactures are envisioned in other embodiments of the present invention.

The amount of memory 160 within ACM 100 is variable, and typically includes a minimum of 16 to 32 Megabytes of dynamic memory. The amount of memory is typically upgradable. Embodiments of memory 160 may include EDO DRAM, SDRAM, Static RAM, Flash memory, and any current or future memory technology devices.

IDE controller 190 supports and provides timing signals necessary for IDE bus 250. In the present embodiment, IDE controller 190 is embodied as a 643U2 PCI to IDE chip from CMD Technology. Other types of buses than IDE are contemplated, for example EIDE, SCSI, USB, and the like in alternative embodiments of the present invention.

Mass storage unite 240 typically includes a computer operating system, application software program files, data files, and the like. In one embodiment, the computer operating system may be the Windows98 operating system from Microsoft Corporation. Other operating systems, such as WindowsNT, MacOS8, Unix, and the like are also contemplated in alternative embodiments of the present invention. Further, typical application software programs may include Office98 by Microsoft, Corel Perfect Suite by Corel, entertainment programs such as Tomb Raider, and others.

Storage unit 240 is typically a hard disk drive (HDD), however, alternative embodiments may include removable hard disk drives, read/write CD ROMs, flash memory, floppy disk drives, and the like. A small form factor, for example 2.5" is currently contemplated, however, other form factors, such as 3.5" drive, PC card, and the like are also contemplated. Mass storage unit 240 may also support other interfaces than IDE, as described above.

In the present embodiment, graphics accelerator 170 provides display signals to analog converter 260 that are provided to display 390 via analog driver interface 470. In one embodiment of the present invention, analog converter 260 outputs a video signal in a well known analog format such as NTSC, PAL, SECAM, S-VHS, closed-circuit, and the like. Other analog video signals are contemplated in other embodiments of the present invention. The present embodiment includes a Bt 857 tv encoder chip from Rockwell Semiconductor Systems.

In alternative embodiments of the present invention, analog converter 260 may actually be a High Definition Television (HDTV) converter. Thus, the signals on analog driver interface 470 may actually be an HDTV signal, for example an ATSC digital television signal, a European Digital Video Broadcast (DVB) signal, and the like.

Graphics accelerator typically also includes an RGB driver to drive an RGB monitor coupled to a desktop console, as illustrated in FIG. 1. In one embodiment of the present invention, the RGB signals are digital signals, although they may also be analog. Different formats may be output and used, for example SVGA, XVGA, and the like.

In the present embodiment, a graphics accelerator is shown as interfacing to the AGP port, however in alternative embodiments of the present invention, PCI based accelerators, and the like may also be used to provide output displays. Further, in the present embodiment, graphics accelerator 170 is shown as a 3D graphics accelerator, however it should be understood that graphics accelerator 170 may be embodied as a 2D and 3D graphics accelerator, only a 2D graphics accelerator, or only a 3D graphics accelerator.

In one embodiment graphics accelerator 170 is embodied as an ATI Rage Pro LT AGP chip set, in another embodiment, graphics accelerator 170 is embodied as an integrated graphics accelerator and memory chip, such as the Neomagic Magic Graph 128×D PCI on the PCI bus. Other embodiments of the present invention may include any present or future chip set that supports PCI bus 200 or AGP 180. Graphics memory 230 is typically embodied in the same manner as memory 160, however may be different. Current embodiments contemplate memory 160 having a memory size of 2 to 8 Megabytes, however may be different and greater.

Host interface controller 130 provides an interface between north bridge 120/PCI bus 200 and south bridge 330/PCI interface 320. In the present embodiment, host interface controller 130 is under development by Acqis, Inc. In the future, other types of interface controllers providing a interface between a different chip set 120 and PCI bus 200 and peripheral devices, such as National Semiconductor's SuperIO and PCI Interface 320 are contemplated.

A BIOS stored in a flash memory is typically coupled to host interface controller 130 to provide ACM system BIOS and configuration data. In one embodiment, two types of ACM configuration data are stored, a desktop console configuration, and a set-top console configuration. The graphics controller driver typically uses the configuration data during power-up to set up proper video output signals. Alternatively, the BIOS may simply store a default configuration that is not used when in a set-top or desktop configuration. These configurations will be described in greater detail below.

Peripheral interface controller 310 also provides an interface between north bridge 120/PCI bus 200 and south bridge 330/PCI interface 320. In the present embodiment, peripheral interface controller 310 is also under development by Acqis, Inc. In the future, other types of interface controllers providing a interface between north bridge 120 and PCI bus 200 and south bridge 330 and PCI interface 320 are also contemplated.

Audio driver 340 typically converts signals provided on PCI bus 320 to analog form for audio output on speakers 370, or other output device. Audio driver may be any conventional audio chip such as Solo™ PCI Audio Drive® from ESS Technology, Inc.

Modem 350 provides interface signals to an external network via network interface 380, for example, a telephone line. Other types of network interfaces are contemplated, for example an Ethernet interface, and the like.

The present embodiment uses peripheral bus 400 to provide control signals between host interface controller 130 and peripheral interface controller 310. In one embodiment of the present invention, peripheral bus 440 is the exchange interface system (XIS) bus disclosed in the referenced patent applications.

Power regulator 140 typically converts voltage provided by power bus 410 to a CPU operating voltage. In one embodiment of the present invention power regulator 140 is embodied as a LM 2630 component from National Semiconductor, although in other embodiments, other components can also be used Configuration data driver 391 stores data related to the particular configuration of set-top console 300. In response to configuration signals from configuration data driver onto configuration interface 430, host interface controller outputs configuration data to host interface controller 130. In response, host interface controller 130 configures ACM 100 according to the configuration data.

Wireless control receiver 392 is also coupled to PCI bus 320 to receive wireless instructions from a remote control as shown in FIG. 1. Wireless control receiver 392 and the remote control may be embodied using infrared technology, FM or other radio technology, and the like.

In the present invention, other typical components that may be disposed within set-top console 300 may include PC (PCMCIA) card slots, storage media and removable storage media including floppy disk drives, hard disks, CD-ROM or DVD drives, keyboards, user input devices such as trackpads, trackballs, pointers, microphones, Computer Module Bays 40 (FIG. 1), and the like. This list is not exhaustive, and many other types of components may also be incorporated within set-top console 300. Embodiments of the present invention may have fewer peripherals, for example, no modem, or other combinations of peripherals.

Figure 3:
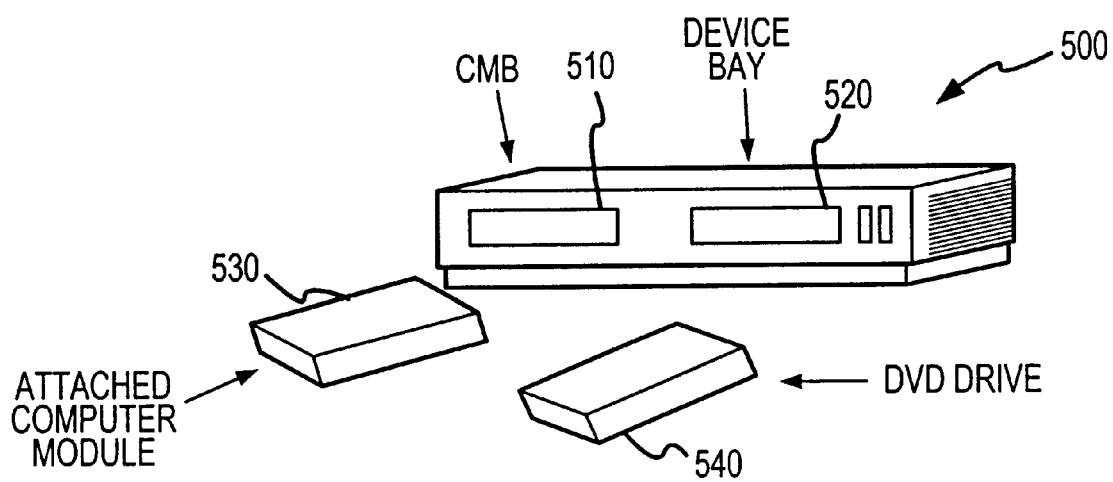
FIG. 3 illustrates another embodiment of the present invention.

In FIG. 3, configuration signals from configuration interface 430 are passed from host interface controller 130 to clocked control logic 220. The configuration signals are typically configured as a logical high or low signal during a specified time period after power-up. For example, a configuration signal can be "high" to indicate use of a television as a default display and "low" to indicate use of a computer monitor as a default display.

FIG. 3 illustrates another embodiment of the present invention. In FIG. 3, a desktop console 500 includes a computer module bay 510 and a device bay 520. As illustrated, computer module bay 510 is adapted to receive an ACM 530, as described above, as well as any conforming device bay module 540, such as a DVD drive.

Figure 4:
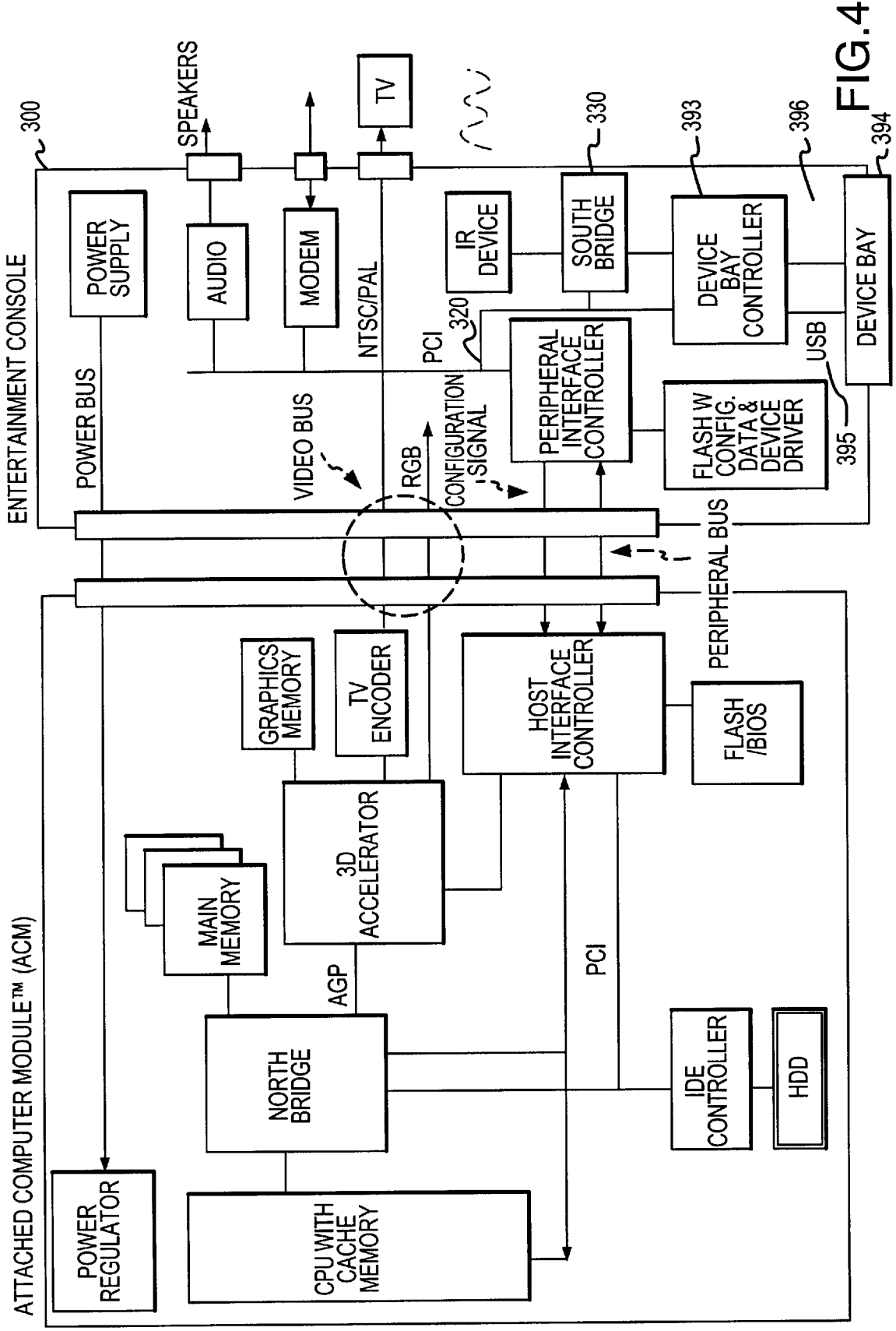
FIG. 4 illustrates a block diagram of an embodiment according to present invention.

FIG. 4 illustrates a block diagram of an embodiment according to present invention. FIG. 4 preferably includes the components of the embodiment illustrated in FIG. 2, in addition to having Device Bay support.

The embodiment of FIG. 4 includes a device bay 394 and a device bay controller 393. As illustrated, device bay controller 393 is coupled to PCI bus 320 and to South Bridge 330. The device bay provides an interface to peripherals plugged into the device bay typically following the USB standard 395 or an IEEE 1394 standard 396.

In the present invention, other typical components that may be disposed within set-top console 300 for example PC (PCMCIA) card slots, storage media and removable storage media including floppy disk drives, hard disks, CD-ROM or DVD drives, keyboards, user input devices such as trackpads, trackballs, pointers, microphones, "Device Bays", Computer Module Bays 40 (FIG. 1), video capture devices, camera interfaces, and the like. This list is not exhaustive, and many other types of components may also be incorporated within set-top console 300.

Figure 5:
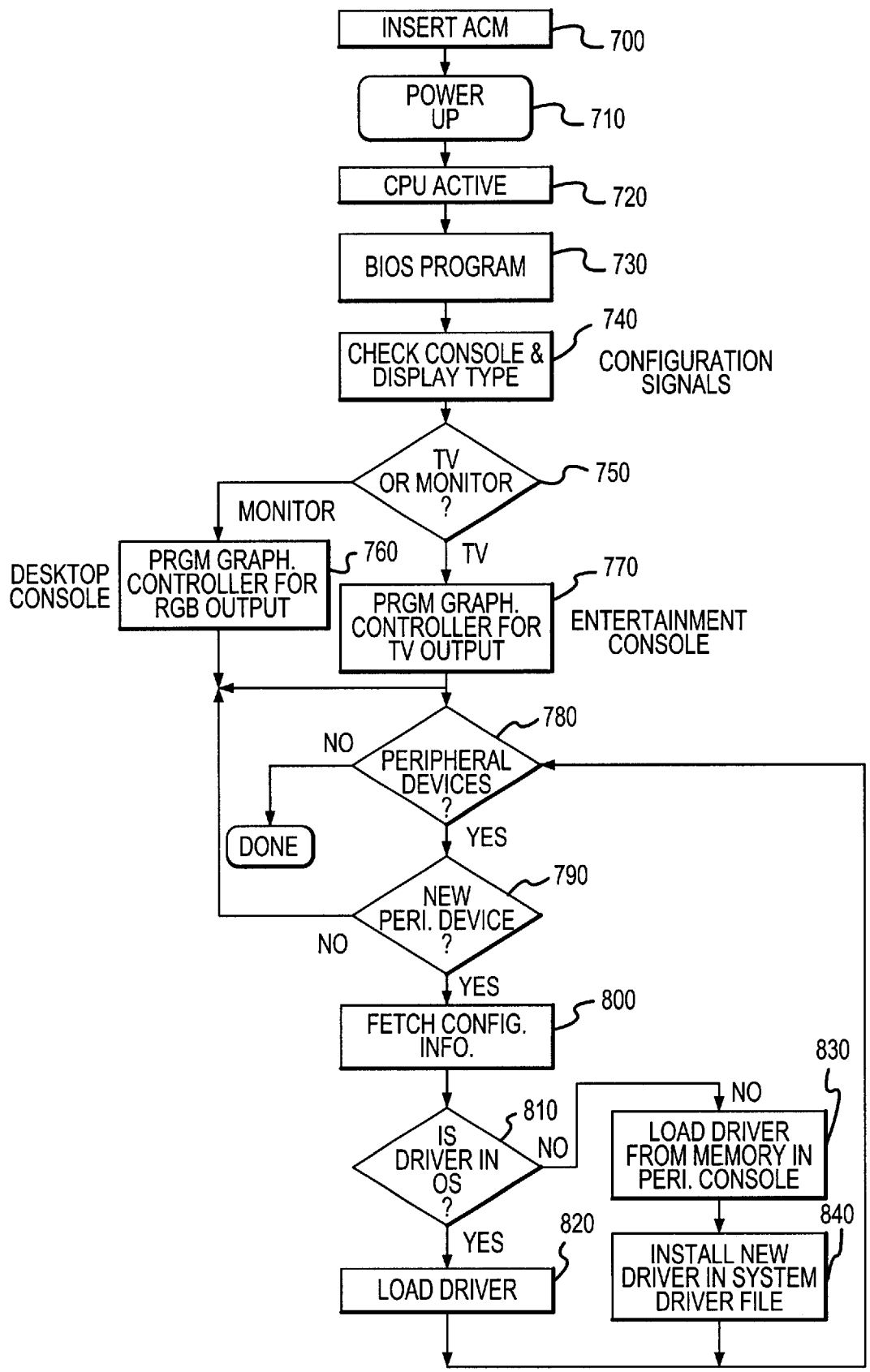
FIG. 5 illustrates a flowchart of embodiments of the present invention.

FIG. 5 illustrates a flowchart of embodiments of the present invention. FIG. 5 uses the reference numerals of the above figures for sake of convenience.

In FIG. 5, ACM 100 is initially inserted into a computer module bay according to embodiments of the present invention, step 700. Next, power is provided to ACM 100, step 710. Once CPU 110 has been powered up, step 720, the BIOS program within BIOS 210 is activated, step 730.

Initially, configuration signals regarding the type of output display are communicated from the console on configuration interface 430 to host interface controller 130 step 740.

In response to the configuration signals, ACM 100 determines whether it is connected to desktop console 30 or set-top console 20, step 750. Further, ACM 100 determines whether an RGB output or an analog video output signal should be output. If the console is determined to be desktop console 30, graphics accelerator 170 is programmed for conventional RGB output, step 760. If the console is determined to be set-top console 20, graphics accelerator 170 is programmed to output analog video signals, 770.

In either case, peripheral devices from the console are then identified, step 780. Initially, it is determined whether a driver for a particular peripheral device has been loaded into ACM 100, step 790. If the driver has been loaded, the next peripheral device is considered. Otherwise, the configuration of the peripheral device is communicated from the console to ACM 100, step 800.

Next, in response to the identification of the peripheral device, ACM 100 determines whether the operating system recognizes the peripheral device, step 810. In particular, ACM 100 determines whether the operating system has a driver appropriate for the peripheral device.

If the operating system in ACM 100 has an appropriate driver, the driver is loaded, step 820. If not, the driver is copied from the console to ACM 100, step 830. Next, the copied driver is then loaded, step 840. After the drivers have been loaded, the next peripheral device is considered.

As disclosed above, typical peripherals and peripheral drivers may include user input devices such as joy sticks, key pads, wireless controllers; user output devices such as rumble packs or force-feedback joysticks; and the like.

Conclusion

In the foregoing specification, the invention has been described with reference to specific exemplary embodiments thereof. Many changes or modifications are readily envisioned. For example, different partitioning of hardware and software between ACMs and consoles are contemplated. As examples, in one embodiment, analog driver 260 may be disposed in set-top console 300 and not in ACM 100. For example, in the case of an HDTV set top console, the HDTV converter (260) may be disposed within set-top console 300. In another embodiment, set-top console may also include a mass storage medium such as a hard drive, for storing programs and data.

The number and types of components within the ACM and the consoles will vary depending upon the specific configuration data required by different CPU manufacturers. Further, the type of configuration data sent by consoles will vary according to specific implementations of embodiments of the present invention. As an example, set-top console 300 may also include a keyboard, mouse or other pointing device, and the like. Further, set-top console 300 may include other network interfaces such as a Ethernet interface, a wireless communication interface, and the like.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A computer system utilizing a television as a display, the computer system comprising:
   a peripheral console in electrical communication with the television, the peripheral console including a power supply and a housing defining a computer module bay; and
   a computer module detachable from the computer module bay of the peripheral console, the computer module including,
   a central processing unit (CPU) of the computer system,
   a television signal encoder,
   a graphics controller,
   a power bus, and
   a hard disk drive,
   such that power is supplied to the CPU to allow the CPU to direct the television signal encoder to transmit a television signal to the television only when the computer module is attached to the peripheral console through the computer module bay, the computer module bay providing mechanical alignment for connection between the computer module and the peripheral console.

2. The system of claim 1 wherein the peripheral console is configured to transmit a configuration signal to the computer module, the configuration signal indicating that the peripheral console is in electrical communication with the television.

3. The system of claim 1 further comprising a color monitor in electrical communication with the peripheral console, the graphics controller configured to output analog RGB signals to the peripheral console.

4. The system of claim 1 wherein the central processing unit is configured to enable or disable an output of the television signals from the television signal encoder based upon a control information.

5. The system of claim 4 wherein the peripheral console further comprises a wireless receiver configured to receive the control information from a remote transmitter.

6. The system of claim 5 wherein the wireless receiver is configured to communicate the control information to the central processing unit.

7. The system of claim 1 wherein the computer module further comprises a control program operable to switch a video output of the computer module between one of an analog RGB signal and a television signal.

8. The system of claim 1 wherein the television signals comprise NTSC video signals.

9. The system of claim 1 wherein the television signals comprise High Definition TV signals.

10. The system of claim 1 wherein the peripheral console is in electrical communication with a communication network.

11. The system of claim 10 wherein the communication network comprises a telephone connection.

12. The system of claim 10 wherein the communication network comprises a local area network.

13. A computer module for use in a computer system utilizing a television as a display, the computer module configured to attach to a computer bay module of a peripheral console, the computer module comprising:
   a central processing unit (CPU);
   a television signal encoder;
   a graphics controller;
   a power bus; and
   a hard disk drive,
   such that power is supplied to the CPU to allow the CPU to direct transmission of a television signal to the television, only when the power bus is in electrical communication with a power supply of the peripheral console, the peripheral console configured to convey the television signal from the computer module to the television, and the computer bay module configured to receive the computer module.

14. A set-top peripheral console in electrical communication with a television, the peripheral console comprising:
   a power supply,
   a wireless input receiver, and
   a computer module bay for receiving a detachable computer module and providing mechanical alignment between the peripheral console and the computer module, the peripheral console in electrical communication with the computer module containing a CPU and a hard disk drive, the CPU receiving power only when the computer module is attached to the peripheral console through the computer module bay.

15. A method for configuring video output of a computer system comprising a peripheral console and a removable computer module having a central processing unit, a hard disk drive, and a television signal encoder, the method comprising:

inserting the removable computer module into a computer module bay of a set-top peripheral console such that the computer module bay provides mechanical alignment between the computer module and the computer module bay;

supplying power to the central processing unit only when the computer module is inserted into the computer module bay of the peripheral console;

determining the presence of one of a television and a color monitor as a display device connected to the peripheral console; and communicating a signal to the computer module to output one of a television signal and an analog RGB video signal to the display device.

16. The method of claim 15 further comprising transmitting a configuration signal to the computer module, the configuration signal indicating that the peripheral console is in electrical communication with a television.

17. The method of claim 15 wherein the central processing unit enables or disables an output of the television signals from the television signal encoder based upon a control information.

18. The method of claim 17 wherein the control information is communicated from a remote transmitter to a wireless receiver of the peripheral controller.

19. The method of claim 18 wherein the wireless receiver communicates the control information to the central processing unit.

20. The method of claim 19 wherein the computer module further comprises a control program operable to switch a video output of the computer module between analog RGB and television signals.

21. The method of claim 20 wherein the control program is operable in response to a signal received from a communication network.

22. The method of claim 21 wherein the signal is received through a telephone connection.

23. The method of claim 21 wherein the signal is received through a local area network.

24. The method of claim 15 wherein the television signal comprises an NTSC video signal.

25. The method of claim 15 wherein the television signal comprises a High Definition TV signal.

* * * * *